Ervin B. Steinberg
INVENTOR.

United States Patent Office 3,489,241
Patented Jan. 13, 1970

3,489,241
CONTROL MEANS FOR SONIC POWER SYSTEM
Ervin B. Steinberg, Stamford, Conn., assignor to Branson Instruments, Incorporated, Stamford Conn., a corporation of Delaware
Filed July 3, 1968, Ser. No. 742,267
Int. Cl. G10k 11/00; G01v 11/00
U.S. Cl. 181—.5                                               7 Claims

ABSTRACT OF THE DISCLOSURE

A monitoring circuit is arranged to sense the audible airborne radiation coming from a sonic or ultrasonic energy source transferring power to a workpiece. The monitoring circuit controls the source, for instance stopping power transfer, when the airborne radiated energy exceeds a predetermined level.

---

This invention refers to a control means for a sonic power system and more specifically has reference to a control means for monitoring the airborne noise produced by a sonic or ultrasonic power system.

Sonic and ultrasonic power is used increasingly for many applications in industry. Typical of such applications are sonic and ultrasonic boring and drilling machines, ultrasonic cleaning apparatus, ultrasonic welding apparatus, sonic riveting devices, etc., see, for instance, the article entitled, "Ultrasonics in Industry," by the applicant, published in Proceedings of the IEEE, volume 53, No. 10, October 1965, pages 1292 to 1304.

While sonic power systems operate generally at a low power level in order to avoid disturbing and harmful noises, ultrasonic power systems can operate at a considerably higher power level since the vibrations generated are inaudible to the human ear. However, while such a source may actually operate in the ultrasonic frequency range, it often occurs that vibrations of lower frequency are generated in the workpiece and that these vibrations, in the audible frequency spectrum, are disturbing and painful to the human ear. At times, such audible noise may exceed a level which is considered tolerable and acoustic shielding, ear plugs and other means need to be provided in order to reduce this troublesome effect.

Recently, concern has been expressed with regard to radiation in the audible frequency spectrum and its effect on the well-being of persons in the vicinity of sonic and ultrasonic power sources. Generally, it is desirable that there be as little audible noise as possible. In order to achieve this aim, the present invention discloses an arrangement for monitoring the power radiated by a sonic or ultasonic power source into the surrounding air and controlling such source when the airborne radiated power, particularly that in the audible frequency spectrum, exceeds a predetermined level.

One of the principal objects of this invention is therefore the provision of a monitoring and control circuit for a sonic or ultrasonic power source.

Another object of this invention is the provision of a control circuit for monitoring the airborne audible power radiated by a sonic or ultrasonic power source and means for shutting down such source when the airborne radiated power exceeds a predetermined level.

Further, and still other objects of this invention will be more clearly apparent by reference to the following description when taken in conjunction with the accompanying drawing, in which.

Figure 1:
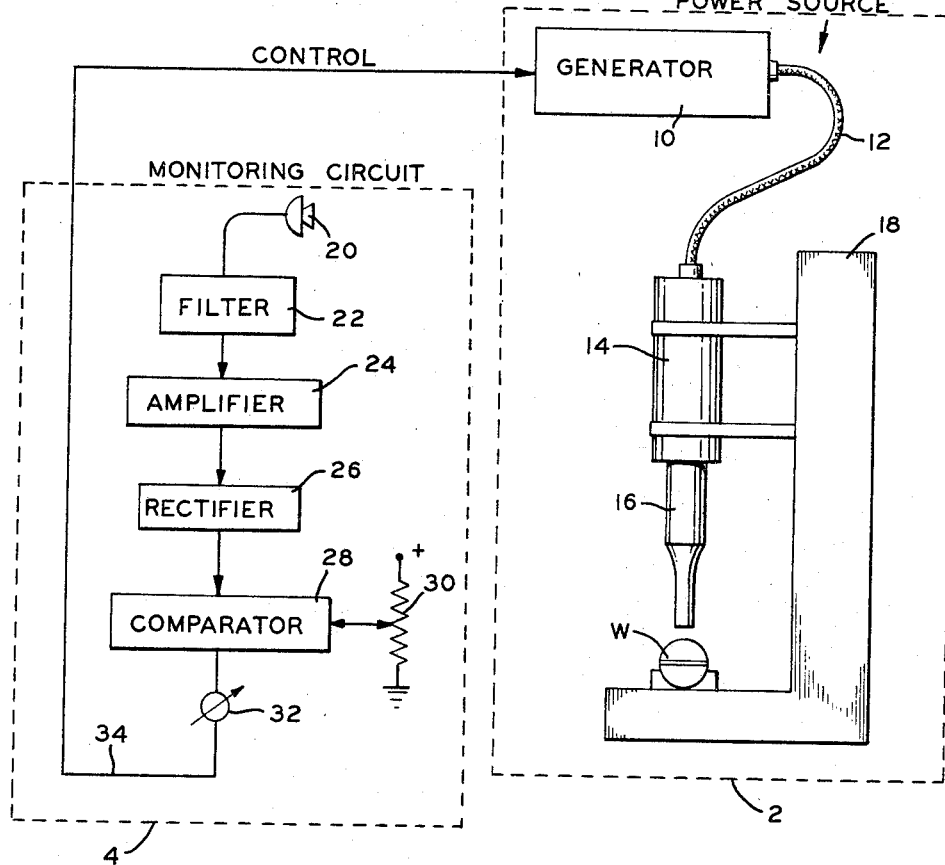
FIGURE 1 is a schematic circuit diagram of a preferred embodiment of my invention.

Referring now to the figures and FIGURE 1 in particular, numeral 2 identifies a sonic or ultrasonic power source, in this example comprising an electrical high frequency generator 10 supplying via a cable 12 electrical power to a sonic power converter 14 which is fitted with a horn 16, also known as a mechanical amplitude transformer, for providing mechanical vibrations at its frontal surface. The converter 14 is supported in a stand 18 so that the converter and horn may be moved vertically relative to a workpiece W which, typically, comprises two pieces of thermoplastic material. When the frontal end of the horn 16 is brought in contact with the surface of the workpiece W, the dissipation of sonic energy at the mating surface between both parts of the workpiece causes a fusion weld. This type of welding application is described in greater detail in U.S. Patent No. 3,224,916 issued to R. S. Soloff et al., entitled, "Sonic Method of Welding Thermoplastic Parts," issued Dec. 21, 1965. While welding of this type, in most instances, is accomplished substantially free from audible noise, there are times when audible noise is developed. This is particularly the case when welding, for instance, long thin sections of a brittle plastic material. Responsive to the transfer of ultrasonic energy from the horn 16 to the workpiece, the workpiece itself is set into resonance and vibrates at a lower frequency which is in the audible range. This often causes a screeching sound which is disturbing and annoying to personnel surrounding such a work station.

In order to monitor the condition of disturbing and possibly harmful audible noise, there is provided a monitoring circuit, numeral 4. This monitoring circuit in the preferred embodiment comprises a sensing device 20, such as a microphone, which is disposed at a certain distance from the work station at which the sonic or ultrasonic power source 2 is located. The microphone 20, placed to receive predominantly the airborne sonic power, is coupled to a filter 22 which typically is adjusted to pass only signals in the audible frequency range, such as the signals in the frequency range from 20 Hz. to 16 kHz. The output from the filter 22 is connected to an amplifier 24 where the output from the filter is amplified and then to a rectifier 26 for providing an average output signal of the input received at the microphone 20. The rectifier 26 is coupled to a comparator circuit 28 which receives one signal from the rectifier and also a reference signal from the source 30. This reference source signal is adjustable, such as by the potentiometer shown. When the signal from the rectifier 26 and received by the comparator circuit exceeds a predetermined level as set by the reference signal, an output appears along the conductor 34, indicated on meter 32, and this output signal is used as a control signal to control the power provided by the generator 10. Typically, the power provided by the generator 10 may be diminished, or the generator 10 may temporarily be shut down so as to immediately stop the audible noise considered annoying or harmful to operating personnel.

Figure 2:
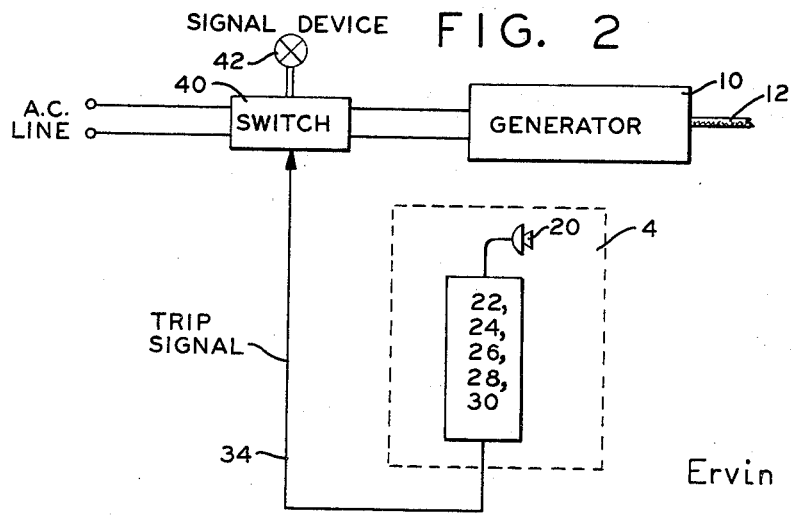
FIGURE 2 is a schematic circuit diagram showing means for interrupting the power flow when the radiated power exceeds a predetermined level.

A typical control arrangement is shown in FIGURE 2 wherein the input to the generator 10 is connected to the alternating current line via a switching device 40. The switching device 40 has a tripping device (not shown). Responsive to an output signal generated by the comparator circuit 28 and appearing along the conductor 34, the switch 40 is tripped, thereby interrupting the power flow from the AC line terminals to the generator 10. When the switch 40 is open, a signalling device 42 is energized, typically a bell, a flag, a light, or some other suitable device indicating that the switch 40 was tripped responsive to a signal provided by the monitoring circuit 4.

In another circuit embodiment, the generator 10 may be provided with means to slightly shift the frequency so as to influence the audible noise generated in the workpiece. Also, the power level may be diminished rather than completely interrupted. Moreover, while the sonic or ultrasonic source 2 shown in FIGURE 1 refers to an ultrasonic welding apparatus, usually operating in the frequency range of 18 to 25 kHz., it shall be understood that the sonic or ultrasonic power source may comprise an ultrasonic cleaning installation, or a sonic device such as sound drills, sonic boring devices, jack hammers, sirens, aircraft engines or similar devices which are capable of generating disturbing and possibly harmful airborne noise.

While there has been described and illustrated a preferred embodiment of my invention and certain modifications have been indicated, it will be apparent to those skilled in the art that various further changes and modifications may be made without deviating from the broad principle and intent of the present invention.

I claim:

1. In a sonic power system wherein sonic power is transferred from a source of sonic power to a load, the improvement comprising:
    sensing means disposed for sensing airborne sonic power emanating from the operation of said system, and
    control means coupled to said source and said sensing means for controlling said source responsive to the airborne power sensed attaining a predetermined level.

2. In a sonic power system as set forth in claim 1, said sensing means being responsive to airborne power in the audible frequency range.

3. In a sonic power system as set forth in claim 2, said source of sonic power operating at a frequency of at least 16 kHz.

4. In a sonic power system as set forth in any one of claims 1, 2, and 3, said control means causing said source to decrease the transfer of sonic power to the load when said predetermined level is attained.

5. In a sonic power system as set forth in claim 1, said source operating at a frequency of at least 16 kHz; said sensing means including a microphone disposed at a distance from said source of said load, and receiving its input predominantly over the air.

6. In a sonic power system as set forth in claim 5, and including means for setting said predetermined level.

7. An ultrasonic welding apparatus comprising:
    a source of ultrasonic power adapted to be coupled to a workpiece for providing ultrasonic power to the workpiece;
    a sensing means adapted to sense airborne audible noise disposed at a distance from said source;
    control means coupled to said source and said sensing means for controlling ultrasonic power from said source to said workpiece responsive to the power sensed by said sensing means exceeding a predetermined level, and
    signalling means coupled to indicate the condition when said control means is controlling said power from said source to the workpiece.

References Cited

UNITED STATES PATENTS 3,153,850   10/1964   Worlton et al. _____ 228—1 X

RODNEY D. BENNETT, Jr., Primary Examiner

D. C. KAUFMAN, Assistant Examiner

U.S. Cl. X.R.

73—69, 70; 228—1; 340—261, 267